(12) United States Patent  
Morita

(10) Patent No.: US 10,397,416 B2
(45) Date of Patent: Aug. 27, 2019

(54) DOCUMENT READING DEVICE GENERATING SEPARATE FILES BASED ON CHARACTER STRINGS RECOGNIZED ON DIFFERENT PAGES

(71) Applicant: KYOCERA Document Solutions Inc., Osaka (JP)

(72) Inventor: Keiko Morita, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/096,203

(22) PCT Filed: May 17, 2018

(86) PCT No.: PCT/JP2018/019076
§ 371 (c)(1),
(2) Date: Oct. 24, 2018

(87) PCT Pub. No.: WO2019/008919
PCT Pub. Date: Jan. 10, 2019

(65) Prior Publication Data
US 2019/0141203 A1 May 9, 2019

(30) Foreign Application Priority Data
Jul. 3, 2017 (JP) ................................ 2017-130707

(51) Int. Cl.
*H04N 1/00* (2006.01)
*H04N 1/21* (2006.01)
(Continued)

(52) U.S. Cl.
CPC ..... *H04N 1/00331* (2013.01); *G06F 16/5846* (2019.01); *G06F 17/21* (2013.01);
(Continued)

(58) Field of Classification Search
None
See application file for complete search history.

(56) References Cited

U.S. PATENT DOCUMENTS

| 5,860,075 A * | 1/1999 | Hashizume ......... G06F 16/5846 715/210 |
| 10,290,365 B2 * | 5/2019 | Shiho ................. G06K 9/00483 |
| 2014/0115436 A1 * | 4/2014 | Beaver ................ G06F 17/2288 715/229 |

FOREIGN PATENT DOCUMENTS

JP 2010-109420 A 5/2010

* cited by examiner

*Primary Examiner* — Scott A Rogers
(74) *Attorney, Agent, or Firm* — IP Business Solutions, LLC

(57) ABSTRACT

A document reading device (20) includes a document reading unit (5) that optically reads an image of a source document, a character string recognizer (102) that recognizes a character string included in a designated region in the source image read by the document reading unit (5), and an image storage controller (103) that stores the source image read by the document reading unit (5) in a storage device. The image storage controller (103) generates, when a character string recognized by the character string recognizer (102) in the source image in a designated page of the source document, and a character string recognized by the character string recognizer (102) in the source image in a preceding page are different from each other, one file including the source images up to the preceding page, and stores the file in the storage device (92).

11 Claims, 9 Drawing Sheets

(51) Int. Cl.
 *G06K 9/00* (2006.01)
 *G06F 17/21* (2006.01)
 *G06F 16/583* (2019.01)
 *H04N 1/387* (2006.01)
(52) U.S. Cl.
 CPC ........... *G06K 9/00463* (2013.01); *H04N 1/00* (2013.01); *H04N 1/00039* (2013.01); *H04N 1/2166* (2013.01); *H04N 1/21* (2013.01); *H04N 1/387* (2013.01)

```
<SETTING EXAMPLE>

·DOCUMENT TYPE
    ├ONE-SIDED
    ├BOTH SIDES
    └SPREAD
        ├BINDING SIDE
        |    ├ LEFT BINDING
        |    └ RIGHT BINDING

·REGION DESIGNATION
    ├POSITION
    |    ├ START POINT(X, Y)
    |    └ END POINT(X, Y)
    ├POSITION OF EVEN-NUMBERED PAGE
    |    ├ SAME AS LEADING PAGE
    |    └ VERTICALLY SYMMETRICAL TO LEADING
    |      PAGE
    └HANDLING OF BLANK
```

DOCUMENT READING DEVICE GENERATING SEPARATE FILES BASED ON CHARACTER STRINGS RECOGNIZED ON DIFFERENT PAGES

TECHNICAL FIELD

The present invention relates to a document reading device that electronizes a document on a paper medium.

BACKGROUND ART

In the case of scanning a source document including a large number of pages with a multifunction peripheral to generating a file of the document, the document may be divided into a plurality of files so as to reduce the file size, when the file size is excessively large. When the unit for dividing is specified by the file size or a certain number of pages in such a case, the source document may be divided at a page inconvenient to the user, depending on the type of the source document. In addition, it is very troublesome for the user to manually designate the page at which the source document is to be divided. Accordingly, a technique to automatically designate the page, at which the source document is to be divided, is being sought for.

A Patent Literature (PTL) 1 cited below discloses a technique, applicable to an image forming apparatus configured to read a source document composed of a plurality of pages and generate an electronic document, including extracting, according to a condition given by the user, a prospective line where a chapter is to be divided, from character strings each constituting a line, extracted by character recognition from the source image read by the image forming apparatus, tentatively highlighting the image of the prospective line with a marker, displaying the image of the page including the prospective line tentatively highlighted with the marker, determining that the prospective line is established as the chapter dividing position, according to an instruction from the user, revising the source image by highlighting the established chapter dividing position with a marker, generating outline data including link information, in which the character string extracted from the line corresponding to the chapter dividing position and the chapter dividing position are associated with each other, and generating the electronic document accompanied with the link information, on the basis of the entirety of the source image and the outline data.

CITATION LIST

Patent Literature

[PTL 1] Japanese Unexamined Patent Application Publication No. 2010-109420.

SUMMARY OF INVENTION

In PTL 1 cited above, for example the character size is utilized as one of chapter dividing criteria. However, the criteria based on a rule, such as the character size, is only effective with respect to a source document made out in consideration of the rule, from the beginning.

The present invention has been accomplished in view of the foregoing situation, and provides a technique to divide, when scanning a source document including a plurality of pages and generating files, the source document into a plurality of files at a page assumed to be convenient to a user, without the need for the user to designate the dividing page, and store the divided files.

SOLUTION TO PROBLEM

In an aspect, the present invention provides a document reading device including a document reading unit that optically reads an image of a source document, a designation reception unit that receives designation of a region in an optionally selected position in the source image, acquired through reading by the document reading unit, a character string recognizer that recognizes a character string included in the region, the designation of which has been received by the designation reception unit, in the source image acquired through reading by the document reading unit, a storage device used to store the source image read by the document reading unit, and an image storage controller that stores the source image read by the document reading unit in the storage device. The image storage controller performs a file dividing operation including generating, when a character string recognized by the character string recognizer in the source image of a preceding page of the source document, and a character string recognized by the character string recognizer in the source image of a current page are different from each other, one file including the source images up to the preceding page, and a separate file including the current and subsequent pages, and storing the file and the separate file in the storage device.

ADVANTAGEOUS EFFECTS OF INVENTION

The foregoing configuration enables, when scanning a source document including a plurality of pages and generating a file, the source document to be divided into a plurality of files at a page assumed to be convenient to the user, without the need for the user to designate the dividing page, and be stored in the divided state.

DESCRIPTION OF EMBODIMENTS

Figure 1:
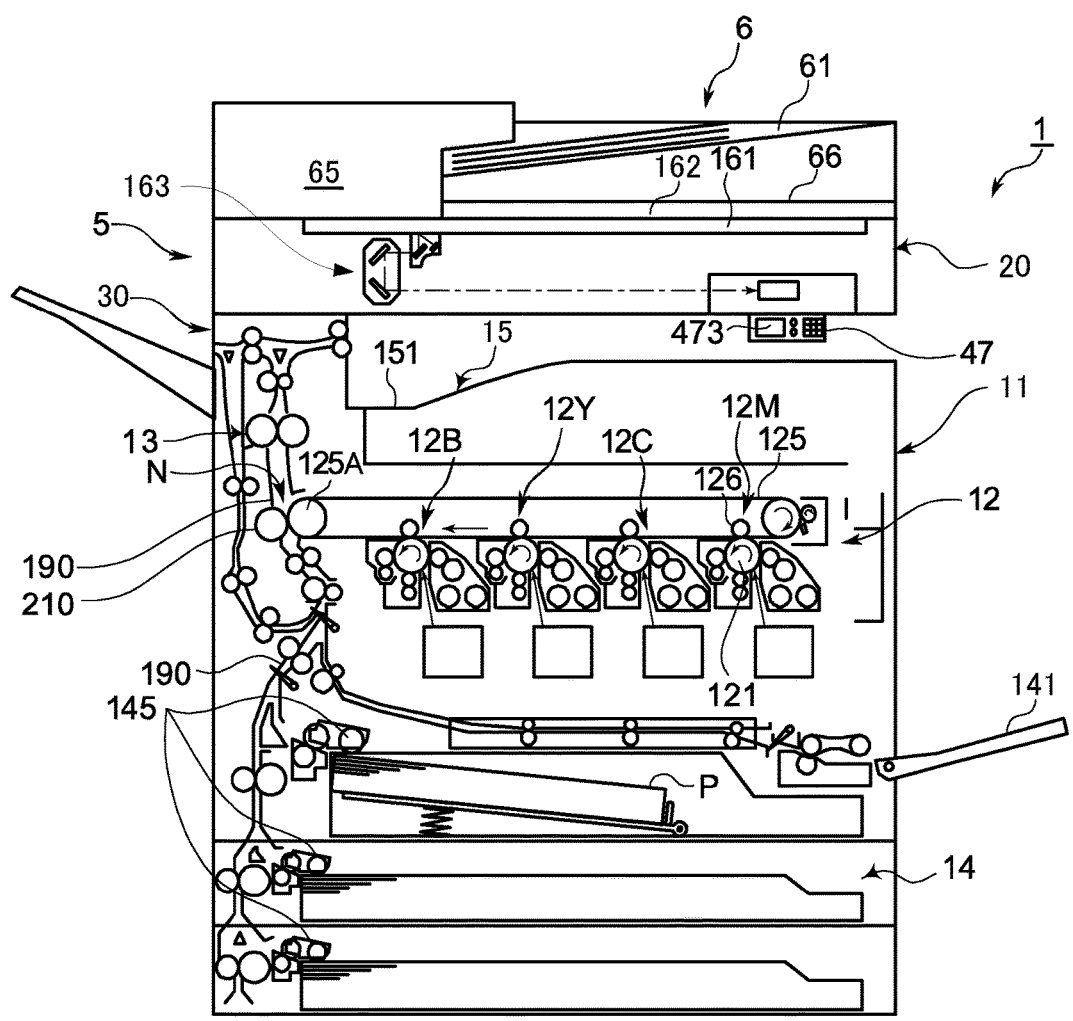
FIG. 1 is a front cross-sectional view showing a configuration of an image forming apparatus including a document reading device according to an embodiment of the present invention.

Hereafter, a document reading device according to an embodiment of the present invention will be described, with reference to the drawings. FIG. 1 is a front cross-sectional view showing a configuration of an image forming apparatus including the document reading device according to the embodiment of the present invention. The image forming apparatus 1 is a multifunction peripheral configured to execute a plurality of functions including, for example, a copying function, a printing function, a scanning function, and a facsimile function.

The image forming apparatus 1 basically includes a main body 11, a document reading device 20 opposed to the main body 11 from an upper side, and an intermediate unit 30 interposed between the document reading device 20 and the main body 11.

The document reading device 20 is mounted on the upper end portion of the intermediate unit 30. The document reading device 20 includes a document reading unit 5, a document transport unit 6, and so forth.

The document reading unit 5 includes a contact glass 161 for placing a source document thereon, fitted in the upper opening of the casing of the document reading unit. The contact glass 161 includes a fixed document reading section (not shown) for reading a source document placed thereon, and a transported document reading section (not shown) for reading a source document being transported by the document transport unit 6. The document reading unit 5 further includes an openable document holding cover 162 for holding the source document placed on the contact glass 161, and a reading device 163 that reads the image of the source document placed on the fixed document reading section of the contact glass 161, and also the image of the source document transported to the transported document reading section of the contact glass 161. The reading device 163 optically reads the image of the source document with an image sensor such as a charge coupled device (CCD) or a complementary metal oxide semiconductor (CMOS), and generates image data.

The document transport unit 6 includes a document table 61 for placing one or more source documents thereon, a document discharge section 66 to which the source document that has undergone the image reading is discharged, and a document transport mechanism 65. The document transport mechanism 65 includes a feed roller, a transport roller, and a document reversing mechanism, which are not shown. The document transport mechanism 65 picks up the source documents placed on the document table 61 one by one, by driving the feed roller and the transport roller, to transport the source documents to the transported document reading section of the contact glass 161, so that the reading device 163 reads the source documents. Then the document transport mechanism 65 discharges the source documents to the document discharge section 66. The document transport mechanism 65 also causes the document reversing mechanism to turn the source document face side down and again deliver the source document to the transported document reading section of the contact glass 161, to allow the reading device 163 to read the images on both sides of the source document.

Further, the document transport unit 6 is pivotably mounted on the document reading unit 5, so as to allow the front side of the document transport unit 6 to be lifted upward. When the upper face of the contact glass 161, serving as a table for the source document, is exposed by lifting up the front side of the document transport unit 6, the user can place a source document to be read, for example a book opened so as to show the left and right pages, on the contact glass 161.

An operation unit 47 is provided on the front side of the document reading device 20. The operation unit 47 is used to input user's instructions related to the functions and operations that the image forming apparatus 1 is configured to execute, for example an image forming instruction and a source document reading instruction. The operation unit 47 includes a display unit 473 for displaying, for example, an operation guide for the user.

The main body 11 includes an image forming unit 12, a fixing unit 13, a paper feed unit 14, and a sheet discharge section 15.

When the image forming apparatus 1 reads a source document, the document reading unit 5 optically reads the image of the source document, transported by the document transport unit 6 or placed on the contact glass 161, and generates the corresponding image data. The image data generated by the document reading unit 5 is stored in a built-in HDD or a computer connected to a network.

When the image forming apparatus 1 forms an image, the image forming unit 12 forms a toner image on a recording sheet P, an example of a recording medium, supplied from the paper feed unit 14, on the basis of the image data generated by the source document, received from a user terminal such as a computer connected to a network or a smartphone, or stored in the built-in HDD. The image forming unit 12 includes image forming subunits 12M, 12C, 12Y, and 12B, each of which includes a photoconductor drum, a developing device that supplies the toner to the photoconductor drum, a toner cartridge for storing the toner, a charging device, an exposure device, and a primary transfer roller 126.

Toner images of the respective colors to be transferred onto an intermediate transfer belt 125 are superposed at an adjusted timing, so as to form a colored toner image. A secondary transfer roller 210 transfers the colored toner image formed on the surface of the intermediate transfer belt 125 onto the recording sheet P transported along a transport route 190 from the paper feed unit 14 by a transport roller pair, at a nip region N of a drive roller 125A engaged with the intermediate transfer belt 125. Then the fixing unit 13 fixes the toner image onto the recording sheet P by thermal compression. The recording sheet P having the colored image formed and fixed thereon is discharged to an output tray 151.

Figure 2:
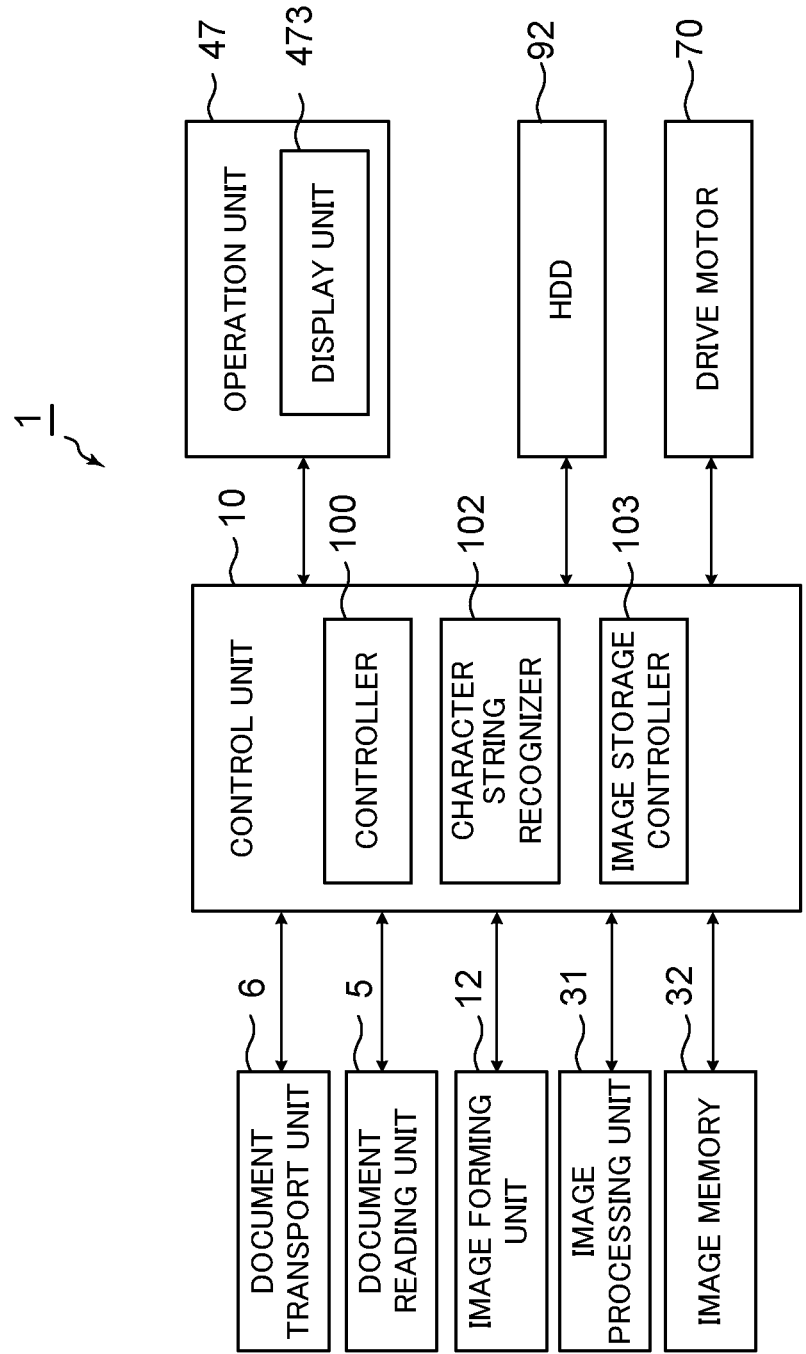
FIG. 2 is a functional block diagram showing an essential internal configuration of the image forming apparatus.

A configuration of the image forming apparatus 1 will be described hereunder. FIG. 2 is a functional block diagram showing an essential internal configuration of the image forming apparatus 1.

The document reading unit 5, controlled by the control unit 10, includes the reading device 163 having a light emitter and a CCD sensor. The document reading unit 5 is configured to read an image from the source document, by irradiating the source document with the light emitter and receiving the reflected light with the CCD sensor.

An image memory 32 is a region for temporarily storing the document image data acquired through reading by the document reading unit 5, and data to be printed by the image forming unit 12.

An image processing unit 31 retrieves the image read by the document reading unit 5 from the image memory 32, and processes the image. For example, the image processing unit 31 executes predetermined image processings such as shading correction, to improve the quality of the image formed by the image forming unit 12 on the basis of the image read by the document reading unit 5.

The image forming unit 12 forms images, according to print data read by the document reading unit 5, or print data received from a computer connected to a network.

The operation unit 47 receives user's instructions related to the functions and operations that the image forming apparatus 1 is configured to execute. The operation unit 47 includes the display unit 473, constituted of liquid crystal as a touch panel. The operation unit 47 receives, for example, user's designation of a region in a desired position in the source image acquired through reading by the document reading unit 5. The operation unit 47 exemplifies the designation reception unit in the present invention.

The display unit 473 displays an operation screen, a preview screen, a confirmation screen of a print job status, and so forth, when the image forming apparatus 1 is in a normal operation mode. When the image forming apparatus 1 is in a sleep mode, the display unit 473 is turned off.

A hard disk drive (HDD) 92 is a large-capacity storage device for storing the source images read by the document reading unit 5.

A drive motor 70 serves as a drive source for supplying a rotational force to the rotary components of the image forming unit 12, and the transport roller pair.

The control unit 10 includes a processor, a RAM, a ROM, an exclusive hardware circuit, and so forth. The processor is, for example, a CPU, a MPU, an ASIC, or the like. The control unit 10 includes a controller 100, a character string recognizer 102, and an image storage controller 103. Here, the HDD 92 or the ROM may contain a document reading program, and the control unit 10 may act as the controller 100, the character string recognizer 102, and the image storage controller 103, by operating according to the document reading program, to execute the operations necessary for executing the document reading described in this embodiment. Alternatively, the control unit 10 may include the controller 100, the character string recognizer 102, and the image storage controller 103 in the form of a hardware circuit, instead of operating according to the document reading program.

The controller 100, which serves to control the overall operation of the image forming apparatus 1, is connected to the document reading unit 5, the document transport unit 6, the image memory 32, the image processing unit 31, the image forming unit 12, the operation unit 47, and the HDD 92, and controls the operation of the mentioned components.

The character string recognizer 102 recognizes a character string included in a region designated in the source image read by the document reading unit 5. To be more detailed, the character string recognizer 102 utilizes an optical character recognition (OCR) technique, to recognize the character string included in the designated region in the source image.

Figure 3A:
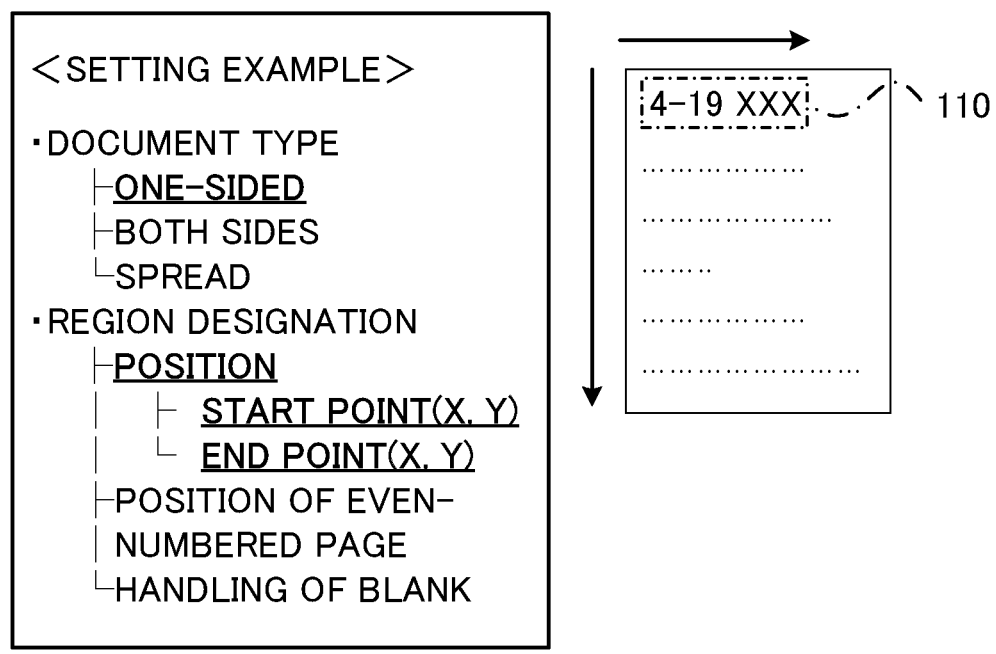
FIG. 3A is a schematic drawing showing a setting example of a region designated for character string recognition.

FIG. 3A is a schematic drawing showing a setting example of a region designated for character string recognition. For example, when the source document is of a type "one-sided source document", a chapter number or caption may be provided in the header of each page. Accordingly, the user specifies a region designated for character string recognition 110, by designating the XY-coordinate of the start point and the end point of the region in the header of the page, where the chapter number or caption is provided, by manipulating the operation unit 47 (e.g., slide operation on the touch panel) to input the designation.

Figure 3B:
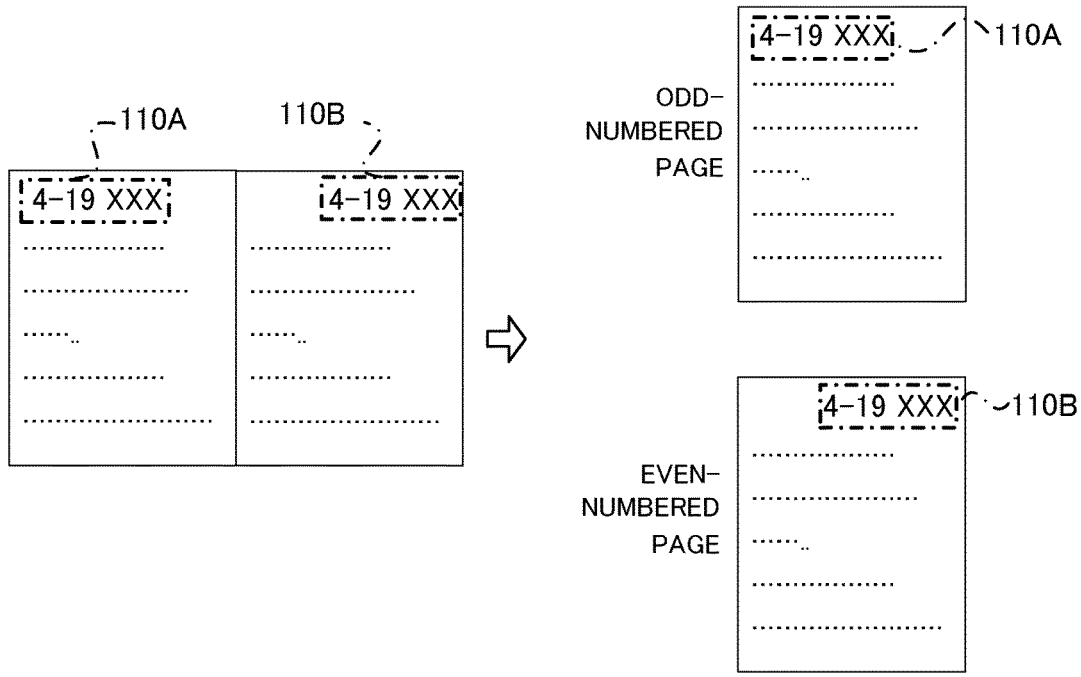
FIG. 3B is a schematic drawing showing another setting example of the region designated for character string recognition.

FIG. 3B is a schematic drawing showing another setting example of the region designated for character string recognition. For example, when the source document is of a type "spread source document", the chapter number or caption may be provided in the header of each of an odd-numbered page and an even-numbered page, at vertically symmetrical positions. Accordingly, the user specifies a region designated for character string recognition 110A, by designating the XY-coordinate of the start point and the end point of the region in the header of the odd-numbered page, where the chapter number or caption is provided, by manipulating the operation unit 47, and specifies a region designated for character string recognition 110B in the even-numbered page, at the position vertically symmetrical to the region in the odd-numbered page.

Further, when the character string recognizer 102 recognizes that the designated region in the source image is blank, the character string recognizer 102 recognizes a character string included in the designated region, in the image of the source image rotated by 180 degrees. Accordingly, in the case where a page turned upside down is mixed in the source document, the orientation of the source image can be corrected, without the need for the user to correct the orientation of the page, which leads to improved user-friendliness. Here, whether the source image is to be rotated by 180 degrees can be selected by the user as desired.

The image storage controller 103 divides the source image read by the document reading unit 5 into a plurality of files, and stores the files in the storage device such as the HDD 92, or a non-illustrated memory of the computer connected to the network. In particular, the image storage controller 103 performs a file dividing operation including generating, when a character string recognized by the character string recognizer 102 in the source image of a preceding page of the source document, and a character string recognized by the character string recognizer 102 in the source image of the current page are different from each other, one file including the source images up to the preceding page, and stores the generated file in the storage device. The image storage controller 103 further generates a separate file including the current and subsequent pages, and stores the separate file in the storage device. Here, the image storage controller 103 generates a file name of the source image, on the basis of the character string recognized by the character string recognizer 102. Therefore, the user can be exempted from taking the trouble to manually input the file name, which leads to improved user-friendliness.

Figure 4:
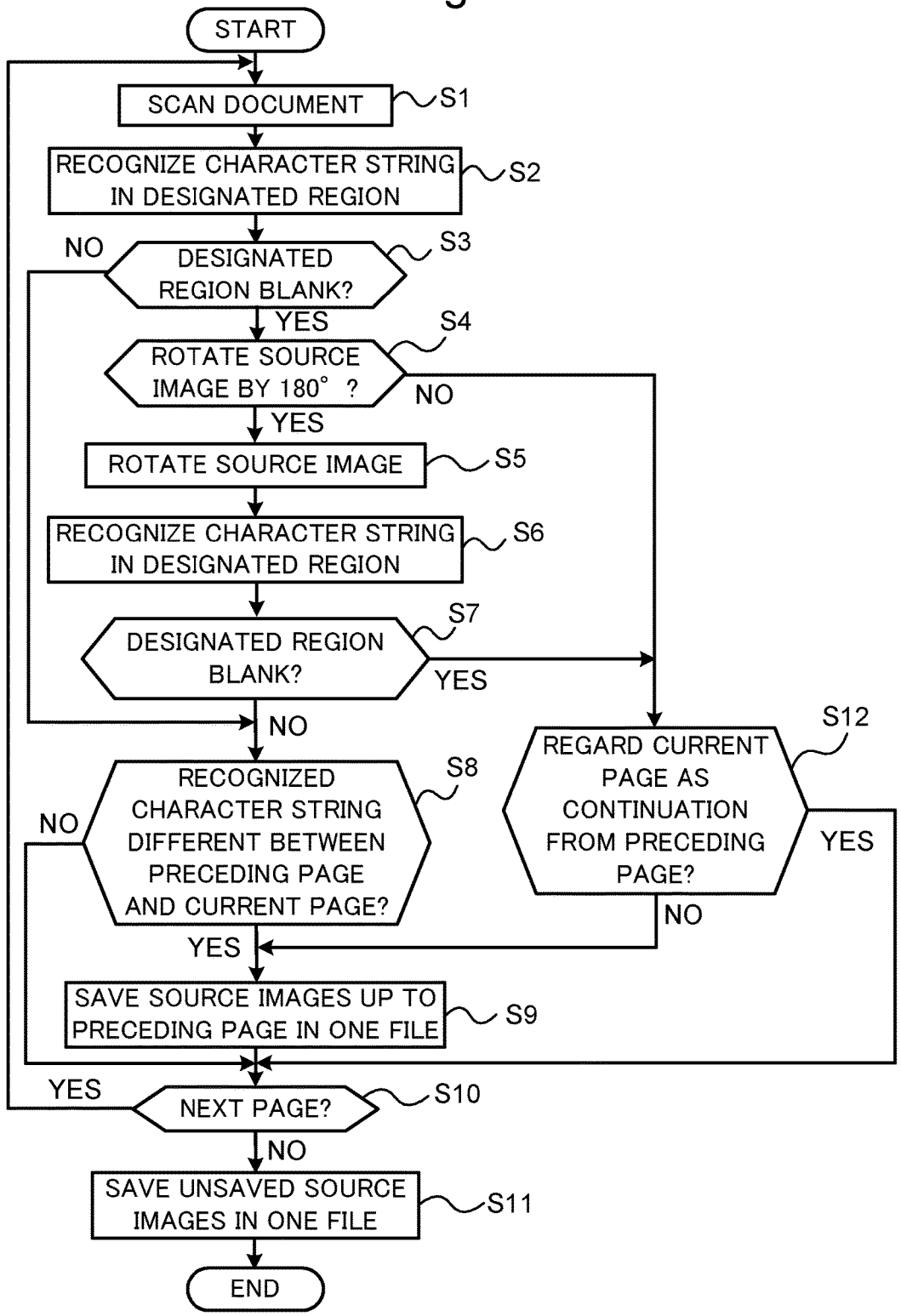
FIG. 4 is a flowchart showing a file dividing operation performed by the image forming apparatus.

Hereunder, a file dividing operation performed by the image forming apparatus 1 will be described. FIG. 4 is a flowchart showing the file dividing operation performed by the image forming apparatus.

First, the document reading unit 5 scans the source documents, transported one by one from the document transport unit 6, to optically read the image of the source documents (S1). The source image read by the document reading unit 5 is temporarily stored in the image memory 32.

When the scanning of one page of the source document is finished, the file dividing operation is started, and the character string recognizer 102 retrieves the source image temporarily stored in the image memory 32, and recognizes the character string included in the designated region (S2).

In the case where the character string recognizer 102 is unable to recognize a character string in the designated region in the source image, in other words the character string recognizer 102 has decided that the designated region is blank (YES at S3), it is probable that the page is turned upside down. Accordingly, in the case where it is permitted by the user to rotate the source image by 180 degrees (YES at S4), the character string recognizer 102 rotates the source image by 180 degrees (S5), and recognizes the character string included in the designated region in the rotated image (S6).

In the case where the character string recognizer 102 has successfully recognized the character string, in other words the designated region is not blank (NO at S3 or NO at S7), the image storage controller 103 compares between the character string recognized by the character string recognizer 102 in the source image of the preceding page of the source document, and the character string recognized by the character string recognizer 102 in the source image of the current page (S8). In the case of deciding that the character strings are different between the preceding page and the current page (YES at S8), the image storage controller 103 generates one file including the source images up to the preceding page, and stores the file in the storage device (S9). Thus, the files are divided between the preceding page and the current page, such that the file including the source images up to the preceding page is stored in the storage device.

In the mentioned process, the image storage controller 103 does not, in principle, take the size or font of each of the character strings compared with each other into account, when deciding whether the character strings are different, but decides whether the character strings are different depending on whether the characters composing the respective character strings agree in terms of a text. However, the image storage controller 103 may decide, with respect to the character strings compared with each other, whether the size or font of equal to or more than a predetermined number of characters in the character string (e.g., ½ of the total number of characters composing the character string) is different between the character strings, and decide that the character strings are different, when it is decided that the size or font of equal to or more than the predetermined number of characters is different between the character strings.

In the case where the image storage controller 103 decides that the character strings of the preceding page and the current page are the same (NO at S8), or that there is a next page of the source document, after the file including the source images up to the preceding page is stored at step S9 (YES at S10), the operation returns to step S1, where the document reading unit 5 reads the next page of the source document. In the case of deciding that there are no remaining pages of the source document (NO at S10), the image storage controller 103 generates one file including unsaved source images, including that of the current page, and stores such file in the storage device (S11), thus finishing the document reading operation.

Figure 5:
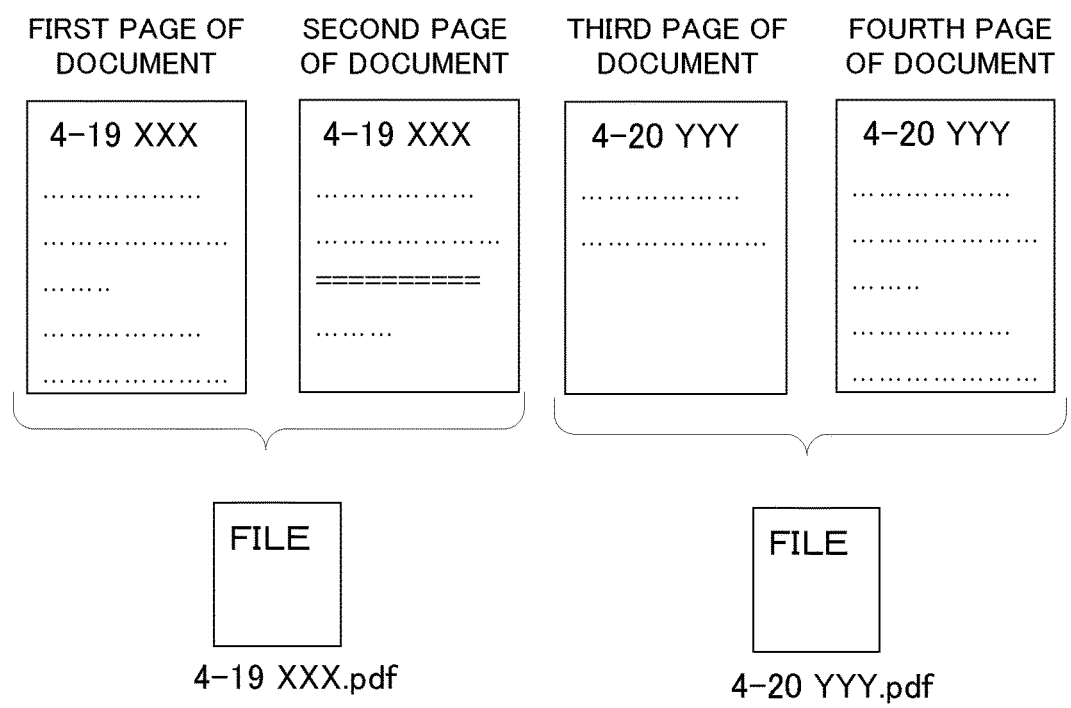
FIG. 5 is a schematic drawing showing an example of a process of saving scanned source images divided into page groups, in separate files.

FIG. 5 is a schematic drawing showing an example of a process of saving the scanned source images divided into page groups, in separate files. For example, when a character string "4-19xxx" is provided in the header of the first page and the second page of the source document, and a character string "4-20yyy" is provided in the header of the third page and the fourth page, the source images of the first page and the second page of the source document are saved under a file name "4-19xxx.pdf", and the source images of the third page and the fourth page are saved under a file name "4-20yyy.pdf", by the character string recognizer 102 and the image storage controller 103, as result of the foregoing document reading operation.

Figure 6:
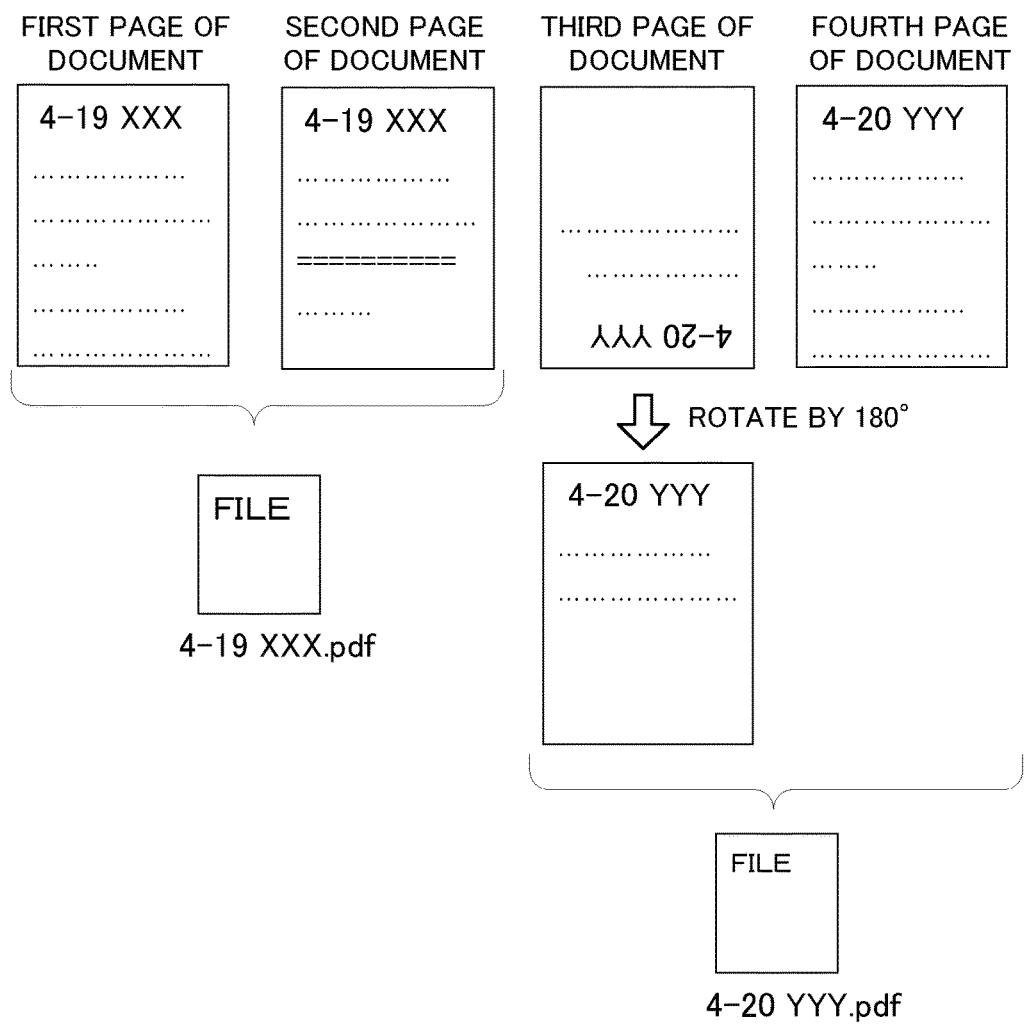
FIG. 6 is a schematic drawing showing an example of a process of saving the source images in separate files, after correcting the orientation of a source image turned upside down and dividing the source images into page groups.

FIG. 6 is a schematic drawing showing an example of a process of saving the source images in separate files, after correcting the orientation of a source image turned upside down and dividing the source images into page groups. For example, when the third page is turned upside down in the same source document as shown in FIG. 5, the character string recognizer 102 rotates the source image of the third page by 180 degrees to thereby recognize the character string "4-20yyy.pdf". Then the image storage controller 103 saves the source images of the first page and the second page of the source document under the file name "4-19xxx.pdf", and the source images of the third page and the fourth page under the file name "4-20yyy.pdf".

Now, the characters may not always be provided in the designated region in all the pages of the source document and, for example, the chapter number or caption may only be provided in the header of either of an odd-numbered page and an even-numbered page. In such a case, the designated region in the source image of the other page is without the characters, in other word blank. With respect to the source image of such pages, the user may select, as desired, whether to regard the page with the blank as continuation from the preceding page and save the page in the same file as the source image of the preceding page, or to save the page with the blank in a separate file from the preceding page, and input the selected instruction through the operation unit 47, so that the operation unit 47 receives such instruction. The image storage controller 103 determines the page at which the file is to be divided according to the instruction, and generates each of the files.

Referring back to FIG. 4, in the case where the character string recognizer 102 has decided that the designated region is blank (YES at S3), and also where it is not allowed to rotate the source image by 180 degrees (NO at S4), or in the case where the character string recognizer 102 is unable to recognize a character string in the designated region, in other words the designated region is blank, despite rotating the source image by 180 degrees (YES at S7), and also where the page in which the designated region is blank is not regarded as the continuation from the preceding page (NO at S12), the image storage controller 103 saves the source images up to the preceding page in one file, and stores such file in the storage device (S9). Thus, the current page in which the designated region is blank is separated from the preceding page, and the file including the source images up to the preceding page is stored in the storage device.

Figure 7:
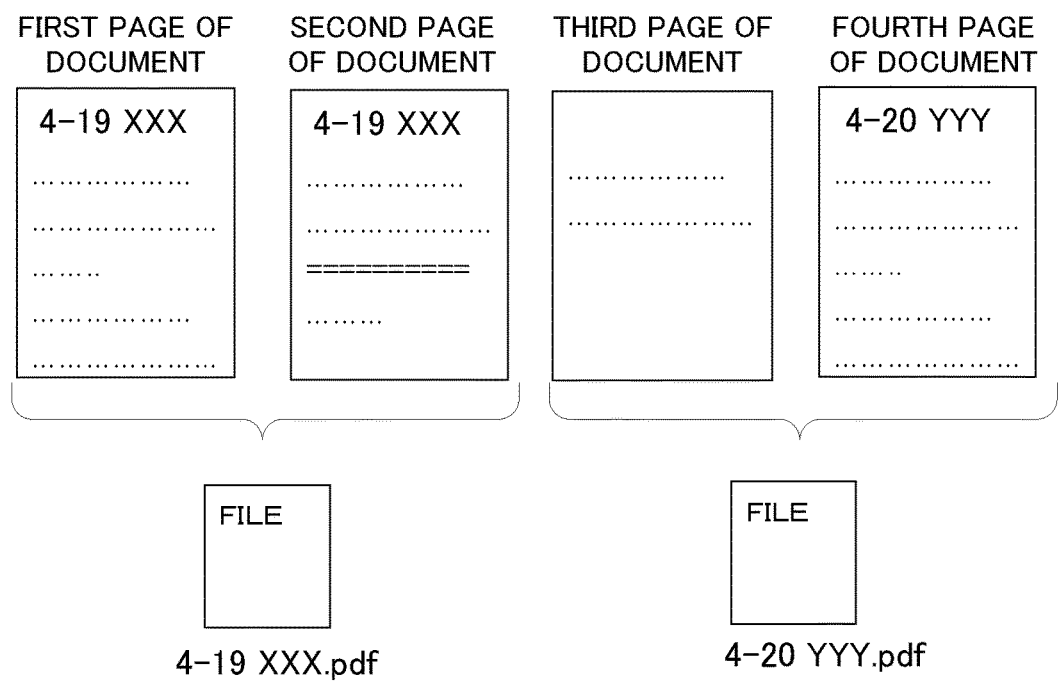
FIG. 7 is a schematic drawing showing an example of a process of saving a page in which a designated region is blank, in a separate file from that of the preceding page.

FIG. 7 is a schematic drawing showing an example of a process of saving a page in which the designated region is blank, in a separate file from that of the preceding page. For example, when the designated region in the third page of the source document is blank, the image storage controller 103 saves the source images up to the second page under the file name "4-19xxx.pdf". On the other hand, the source images of the third and subsequent pages are saved by the image storage controller 103 under the file name "4-20yyy.pdf", on the basis of the character string "4-20yyy" recognized in the designated region in the source image of the fourth page.

In the case where the page in which the designated region is blank is regarded as the continuation from the preceding page (YES at S12), the image storage controller 103 does not save the source images up to the preceding page, and provided that there is a next page of the source document (YES at S10), the operation returns to step S1, where the document reading unit 5 reads the next page of the source document.

Figure 8:
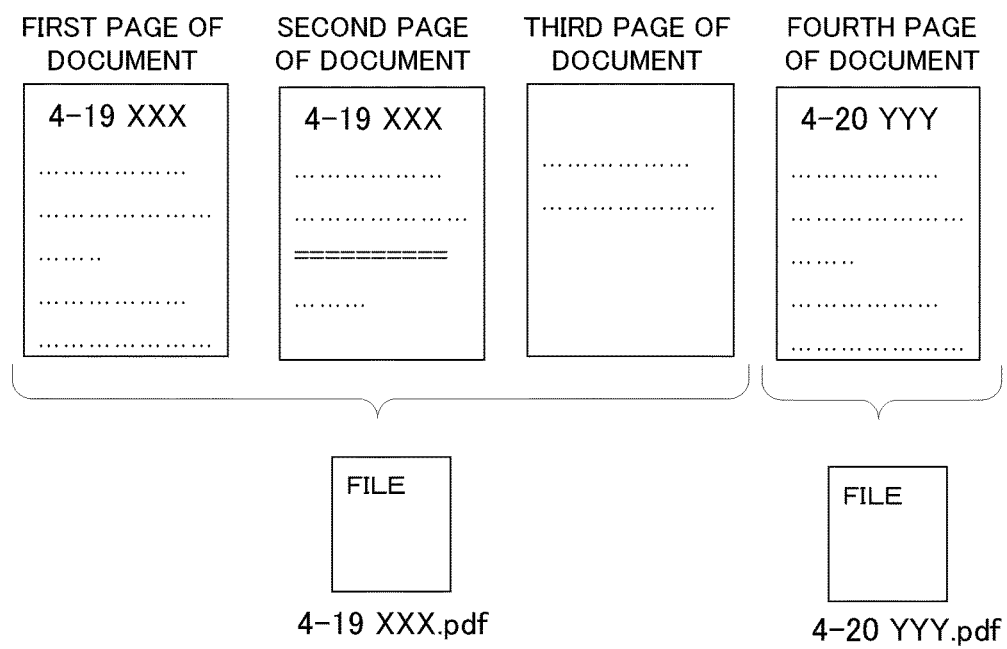
FIG. 8 is a schematic drawing showing an example of a process of saving a page in which the designated region is blank, in the same file as that of the preceding page.

FIG. 8 is a schematic drawing showing an example of a process of saving a page in which the designated region is blank, in the same file as that of the preceding page. For example, when the designated region in the third page of the source document is blank, the third page is regarded as the continuation from the second page, and the image storage controller 103 stores the file named as "4-19xxx.pdf" including the source images up to the third page, as well as the file named as "4-20yyy.pdf" including the source image of the fourth page, in the storage device.

The configuration according to this embodiment enables, when scanning a source document including a plurality of pages to generate files, the source document to be divided into a plurality of files at a page assumed to be convenient to the user, without the need for the user to designate the dividing page, and be stored in the divided state. Therefore, the user can be exempted from taking the trouble to manually designate the page at which the source document is to be divided, which leads to improved user-friendliness.

Here, the foregoing embodiment represents the case where the character string in the designated region is recognized and the file dividing operation is performed, each time the scanning of one page of the source document is finished. In other words, the character string recognizer 102 recognizes the character string in the designated region, and the image storage controller 103 performs the file dividing operation, each time the document reading unit 5 has read one page of the source document. Instead, the character string in the designated region of each of the pages may be recognized, and the file dividing operation may be performed, after all the pages of the source document have been scanned and the source image data of all the pages is accumulated in the image memory 32. In other words, the character string recognizer 102 may recognize the character string in the designated region in each of the pages, and the image storage controller 103 may perform the file dividing operation, after the document reading unit 5 have read all the pages of the source document, and accumulated the source image data of all the pages in the image memory 32 (storage device).

Although some embodiments of the present invention have been described as above, the present invention is not limited to the foregoing embodiments but may be modified in various manners. For example, the user may designate the footer region or a region close to the vertical edge of the page, instead of the header region, as the region where the character string is to be read, through the operation unit 47. In this case, naturally, the character string recognizer 102 recognizes the character string in the region designated as above.

In the foregoing embodiment, further, the image storage controller 103 may be configured to perform the file dividing operation specified in S2 to S11, when a data amount of the source image read by the document reading unit 5 at S1 above exceeds a predetermined data amount.

Although the foregoing embodiment represent the cases where the document reading device according to the present invention is incorporated in the multifunction peripheral, the present invention is broadly applicable to different apparatuses, such as a copier, a facsimile machine, a scanner, and so forth.

The configurations and processings according to the embodiments, described with reference to FIG. 1 to FIG. 8, are merely exemplary and in no way intended to limit the present invention to those configurations and processings.

The invention claimed is:

1. A document reading device comprising:
   a document reading unit that optically reads an image of a source document;
   a designation reception unit that receives designation of a region in an optionally selected position in the source image, acquired through reading by the document reading unit;
   a character string recognizer that recognizes a character string included in the region, the designation of which has been received by the designation reception unit, in the source image acquired through reading by the document reading unit;
   a storage device used to store the source image read by the document reading unit; and
   an image storage controller that stores the source image read by the document reading unit in the storage device,
   wherein the image storage controller performs a file dividing operation including generating, when a character string recognized by the character string recognizer in the source image of a preceding page of the source document, and a character string recognized by the character string recognizer in the source image of a current page are different from each other, one file including the source images up to the preceding page, and a separate file including the current and subsequent pages, and storing the file and the separate file in the storage device.

2. The document reading device according to claim 1, wherein the image storage controller performs the file dividing operation, when a data amount of the source image read by the document reading unit exceeds a predetermined data amount.

3. The document reading device according to claim 1, wherein the image storage controller generates a file name of the source image, on a basis of the character string recognized by the character string recognizer.

4. The document reading device according to claim 1, wherein the character string recognizer recognizes the character string, by setting the designated region on each of an odd-numbered page and an even-numbered page of the source document, at vertically symmetrical positions.

5. The document reading device according to claim 1, wherein the character string recognizer recognizes, upon recognizing that the designated region is blank, the character string included in the designated region, in an image formed by rotating the source image by 180 degrees.

6. The document reading device according to claim 1, wherein, when the character string recognizer recognizes that the designated region in the source image of the current page is blank, the image storage controller performs the file dividing operation including saving the source image of the current page in one file, together with the source images up to the preceding page, and saving one or more pages subsequent to the current page in a separate file.

7. The document reading device according to claim 1, wherein, when the character string recognizer recognizes that the designated region in the source image of the current page is blank, the image storage controller performs the file dividing operation including saving the source image of the current page in one file, together with the source image of one or more pages subsequent to the current page, and saving one or more pages preceding the current page in a separate file.

8. The document reading device according to claim 1, wherein the image storage controller performs the file dividing operation on an assumption that the character string recognized by the character string recognizer in the source image in the preceding page of the source document, and the character string recognized by the character string recognizer in the source image in the current page are different from each other, when the character string recognizer decides that the characters composing the respective character strings are different in terms of a text, instead of deciding whether a size or font of each of the character strings is different.

9. The document reading device according to claim 1, wherein the image storage controller performs the file dividing operation on an assumption that the character string recognized by the character string recognizer in the source image in the preceding page of the source document, and the character string recognized by the character string recognizer in the source image in the current page are different from each other, when the character string recognizer decides that the size or font of equal to or more than a predetermined number of characters is different between the character strings.

10. The document reading device according to claim 1, wherein the character string recognizer recognizes the character string in the designated region, and the image storage controller performs the file dividing operation, each time the document reading unit has read one page of the source document.

11. The document reading device according to claim 1, wherein the character string recognizer recognizes the character string in the designated region in each of pages, and the image storage controller performs the file dividing operation, after the document reading unit have read all the pages of the source document, and accumulated the source image data of all the pages in the storage device.

* * * * *